(12) United States Patent
Gilchrist et al.

(10) Patent No.: US 8,621,558 B2
(45) Date of Patent: *Dec. 31, 2013

(54) METHOD AND APPARATUS FOR DIGITAL RIGHTS MANAGEMENT POLICIES

(75) Inventors: Gary Gilchrist, San Francisco, CA (US); Sangameswaran Viswanathan, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,434

(22) Filed: Feb. 16, 2012

(65) Prior Publication Data

US 2012/0151556 A1    Jun. 14, 2012

Related U.S. Application Data

(63) Continuation of application No. 11/311,844, filed on Dec. 19, 2005, now Pat. No. 8,181,220.

(51) Int. Cl.
*H04L 29/06* (2006.01)

(52) U.S. Cl.
USPC ............................................................. 726/1

(58) Field of Classification Search
None
See application file for complete search history.

(56) References Cited

U.S. PATENT DOCUMENTS

| | | | |
|---|---|---|---|
| 5,687,303 A | 11/1997 | Motamed et al. | |
| 5,854,882 A | 12/1998 | Wang | |
| 5,933,498 A * | 8/1999 | Schneck et al. | 705/54 |
| 6,020,897 A | 2/2000 | Carlsen et al. | |
| 6,025,927 A | 2/2000 | Honma | |
| 6,049,339 A | 4/2000 | Schiller et al. | |
| 6,182,279 B1 | 1/2001 | Buxton | |
| 6,230,174 B1 | 5/2001 | Berger et al. | |
| 6,313,847 B1 | 11/2001 | Carlsen | |
| 6,456,295 B1 | 9/2002 | Schiller | |

(Continued)

FOREIGN PATENT DOCUMENTS

| | | |
|---|---|---|
| EP | 1061431 A2 | 12/2000 |
| GB | 2397673 A1 | 7/2004 |

(Continued)

OTHER PUBLICATIONS

"U.S. Appl. No. 11/311,758, Advisory Action mailed Jun. 24, 2009", 2 pgs.

(Continued)

*Primary Examiner* — Oscar Louie
(74) *Attorney, Agent, or Firm* — Schwegman Lundberg Woessner P.A.

(57) ABSTRACT

Method and apparatus are described wherein, in one example embodiment, there is provided one or more policy templates that may define a set of policy permissions or other attributes that may be desirable to specify in a policy. One or more policy templates may be specified in a user interface of a policy creation and maintenance program that may run on the policy server and/or run on a workstation computer. Each policy template specified by a user may include permissions for how a user may access and use a document. The maintenance program may, in one embodiment, associate both templates to a policy used for a specific unit of digital content, or, for example, an electronic document. The permissions for the policy are determined by aggregating the permissions associated with each respective templates chosen by the user. According to another example embodiment, a user selects a policy template and defines one or more additional permissions to form an augmented policy.

20 Claims, 8 Drawing Sheets

(56) References Cited

U.S. PATENT DOCUMENTS

| | | | |
|---|---|---|---|
| 6,515,675 | B1 | 2/2003 | Bourdev |
| 6,658,568 | B1 | 12/2003 | Ginter et al. |
| 6,678,072 | B1 | 1/2004 | Matsuoka et al. |
| 6,720,977 | B1 | 4/2004 | Bourdev et al. |
| 6,738,908 | B1 | 5/2004 | Bonn et al. |
| 6,825,852 | B1 | 11/2004 | Hamburg |
| 6,978,379 | B1 | 12/2005 | Goh et al. |
| 7,043,660 | B1 | 5/2006 | Bolar |
| 7,275,208 | B2 * | 9/2007 | Uramoto et al. ............. 715/237 |
| 7,477,600 | B1 | 1/2009 | Mor et al. |
| 8,181,220 | B2 * | 5/2012 | Gilchrist et al. ................ 726/1 |
| 2002/0178271 | A1 | 11/2002 | Graham et al. |
| 2003/0131235 | A1 | 7/2003 | Wheeler et al. |
| 2003/0174187 | A1 | 9/2003 | Greive |
| 2003/0229852 | A1 * | 12/2003 | Uramoto et al. ............. 715/513 |
| 2004/0003268 | A1 | 1/2004 | Bourne et al. |
| 2004/0039932 | A1 | 2/2004 | Elazar et al. |
| 2004/0086156 | A1 | 5/2004 | Furukawa et al. |
| 2004/0125404 | A1 | 7/2004 | Isshiki |
| 2004/0167984 | A1 | 8/2004 | Herrmann |
| 2004/0243819 | A1 | 12/2004 | Bourne et al. |
| 2005/0083346 | A1 | 4/2005 | Takahashi et al. |
| 2005/0086252 | A1 | 4/2005 | Jones et al. |
| 2005/0114672 | A1 * | 5/2005 | Duncan et al. ................ 713/182 |
| 2005/0131712 | A1 | 6/2005 | Kaminsky et al. |
| 2005/0283822 | A1 | 12/2005 | Appleby et al. |
| 2006/0092861 | A1 | 5/2006 | Corday et al. |
| 2006/0156385 | A1 | 7/2006 | Chiviendacz et al. |
| 2006/0282880 | A1 | 12/2006 | Haverinen et al. |
| 2007/0121131 | A1 | 5/2007 | Hauser |
| 2007/0121160 | A1 | 5/2007 | Markovic |
| 2007/0143855 | A1 | 6/2007 | Gilchrist et al. |

FOREIGN PATENT DOCUMENTS

| | | | |
|---|---|---|---|
| WO | WO-2007064851 | A2 | 6/2007 |
| WO | WO-2007064851 | A3 | 6/2007 |
| WO | WO-2007064915 | A2 | 6/2007 |
| WO | WO-2007064915 | A3 | 6/2007 |

OTHER PUBLICATIONS

"U.S. Appl. No. 11/311,758, Final Office Action mailed Apr. 21, 2009", 10 pgs.

"U.S. Appl. No. 11/311,758, Final Office Action mailed Apr. 29, 2010", 14 pgs.

"U.S. Appl. No. 11/311,758, Final Office Action mailed Sep. 9, 2011", 22 pgs.

"U.S. Appl. No. 11/311,758, Non-Final Office Action mailed Oct. 14, 2008", 14 pgs.

"U.S. Appl. No. 11/311,758, Non-Final Office Action mailed Apr. 11, 2011", 21 pgs.

"U.S. Appl. No. 11/311,758, Non-Final Office Action mailed Oct. 1, 2009", 11 pgs.

"U.S. Appl. No. 11/311,758, Response filed Jan. 4, 2010 to Non-Final Office Action mailed Oct. 1, 2009", 8 pgs.

"U.S. Appl. No. 11/311,758, Response filed Jan. 12, 2009 to Non-Final Office Action mailed Oct. 14, 2008", 9 pgs.

"U.S. Appl. No. 11/311,758, Response filed Jun. 11, 2009 to Final Office Action mailed Apr. 21, 2009", 9 pgs.

"U.S. Appl. No. 11/311,758, Response filed Jul. 11, 2011 to Non-Final Office Action mailed Apr. 11, 2011", 11 pgs.

"U.S. Appl. No. 11/311,758, Response filed Jul. 29, 2010 to Final Office Action mailed Apr. 29, 2010", 9 pgs.

"U.S. Appl. No. 11/311,758, Response filed Dec. 8, 2011 to Final Office Action mailed Sep. 9, 2011", 11 pgs.

"U.S. Appl. No. 11/311,844 Final Office Action mailed Jul. 27, 2010", 19 pgs.

"U.S. Appl. No. 11/311,844, Non-Final Office Action mailed Feb. 23, 2010", 22 pgs.

"U.S. Appl. No. 11/311,844, Non-Final Office Action mailed Jun. 30, 2011", 29 pgs.

"U.S. Appl. No. 11/311,844, Notice of Allowance mailed Nov. 21, 2011", 19 pgs.

"U.S. Appl. No. 11/311,844, Response filed May 24, 2010 to Non-Final Office Action mailed Feb. 23, 2010", 19 pgs.

"U.S. Appl. No. 11/311,844, Response filed Aug. 29, 2011 to Non-Final Office Action mailed Jun. 30, 2011", 15 pgs.

"European Application Serial No. 06126372.9, European Search Report Mailed Jan. 25, 2010", 3 pgs.

"European Application Serial No. 06126372.9, Search Report mailed Dec. 14, 2009", 8 pgs.

"International Application Serial No. PCT/US2006/046041, International Search Report Oct. 5, 2007", 4 pgs.

"International Application Serial No. PCT/US2006/046041, Written Opinion Oct. 5, 2007", 5 pgs.

White, Ron, "How Computers Work, Millennium Ed.", Indianapolis, IN: Que Corporation, (Sep. 1999), 421 pages.

* cited by examiner

| POLICY TEMPLATE ||||||
|---|---|---|---|---|---|
| ROLE | VIEWING RIGHTS | COPY RIGHTS | MODIFY RIGHTS | ... | OTHER RIGHTS |
| A | Y/N | Y/N | Y/N | ... | Y/N |
| B | Y/N | Y/N | Y/N | ... | Y/N |
| ⋮ | ⋮ | ⋮ | ⋮ | ⋮ | ⋮ |
| N | Y/N | Y/N | Y/N | ... | Y/N |

| SELECT POLICY TEMPLATE(S) FOR: POLICY ID |||
|---|---|---|
| GO | POLICY TEMPLATE NAME | DESCRIPTION |
| ☐ | A | ... |
| ☐ | B | ... |
| ⋮ | ⋮ | ⋮ |
| ☐ | N | ... |

| ROLE | VIEWING RIGHTS | COPY RIGHTS | MODIFY RIGHTS | ... | OTHER RIGHTS |
|---|---|---|---|---|---|
| A | Y/N | Y/N | Y/N | ... | Y/N |
| B | Y/N | Y/N | Y/N | ... | Y/N |
| ⋮ | ⋮ | ⋮ | ⋮ | ⋮ | ⋮ |
| N | Y/N | Y/N | Y/N | ... | Y/N |

*FIG. 6A*

| SELECT POLICY TEMPLATE(S) FOR: POLICY ID | | |
|---|---|---|
| GO | POLICY TEMPLATE NAME | DESCRIPTION |
| ☐ | A | ... |
| ☐ | B | ... |
| ⋮ | ⋮ | ⋮ |
| ☐ | N | ... |

FIG. 10

METHOD AND APPARATUS FOR DIGITAL RIGHTS MANAGEMENT POLICIES

CROSS-REFERENCE TO RELATED APPLICATIONS

This patent application is a continuation of U.S. patent application Ser. No. 11/311,844 filed Dec. 19, 2005, which is incorporated herein by reference in its entirety.

TECHNICAL FIELD

The subject matter relates generally to the field of digital rights management, and more particularly to authentication in digital rights management.

RELATED APPLICATIONS

This application is related to U.S. application Ser. No. 11/311,758, entitled, "AUTHENTICATION USING A DIGITAL RIGHTS MANAGEMENT POLICY," by Gary Gilchrist and Sangameswaran Viswanathan, filed on Dec. 19, 2005, and assigned to Adobe Systems, Inc.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2005, Adobe Systems Inc. All Rights Reserved.

BACKGROUND

Digital rights management (DRM), as its name implies, applies to digital media. Digital media encompasses digital audio, digital video, the World Wide Web, and other technologies that can be used to create, refer to and distribute digital "content." Digital media represents a major change from all previous media technologies. Post-production of digital media is cheaper and more flexible than that of analog media, and the end result can be reproduced indefinitely without any loss of quality. Furthermore, digital content can be combined to make new forms of content. The first signs of this are visible in the use of techniques such as sampling and remixing in the music industry.

Digital media have gained in popularity over analog media both because of technical advantages associated with their production, reproduction, and manipulation, and also because they are sometimes of higher perceptual quality than their analog counterparts. Since the advent of personal computers, digital media files have become easy to copy an unlimited number of times without any degradation in the quality of subsequent copies. Many analog media lose quality with each copy generation, and often even during normal use.

The popularity of the Internet and file sharing tools have made the distribution of digital media files simple. The ease with which they can be copied and distributed, while beneficial in many ways, presents both a security risk and a threat to the value of copyrighted material contained in the media. Although technical control measures on the reproduction and use of application software have been common since the 1980s, DRM usually refers to the increasing use of similar measures for artistic and literary works, or copyrightable content in general. Beyond the existing legal restrictions which copyright law imposes on the owner of the physical copy of a work, most DRM schemes can, and do, enforce additional restrictions at the sole discretion of the media distributor (which may or may not be the same entity as the copyright holder).

DRM vendors and publishers coined the term digital rights management to refer to various types of measures to control access to digital rights, as for example discussed herein, but not limited to those measures discussed herein. DRM may be thought of as a variant of mandatory access control wherein a central policy set by an administrator is enforced by a computer system.

Rights management systems allow a policy to be associated with a document. This policy may be unique for the document or it may be used for multiple documents. If a user wishes to secure a document with permission assignments that are already covered by a set of policies, then a new policy still needs to be defined for this purpose. Also, if many documents are secured using the same policy, but one document needs extra permission assignments, then it is also necessary to define a new policy for that document. This can result in a large number of policies in the system with duplicated rights assignments.

DETAILED DESCRIPTION

In the following detailed description, reference is made to the accompanying drawings that form a part hereof, and in which are shown, by way of illustration, specific embodiments in which the inventive subject matter can be practiced.

It is understood that other embodiments may be utilized and structural changes may be made without departing from the scope of the inventive subject matter. The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

Figure 1:
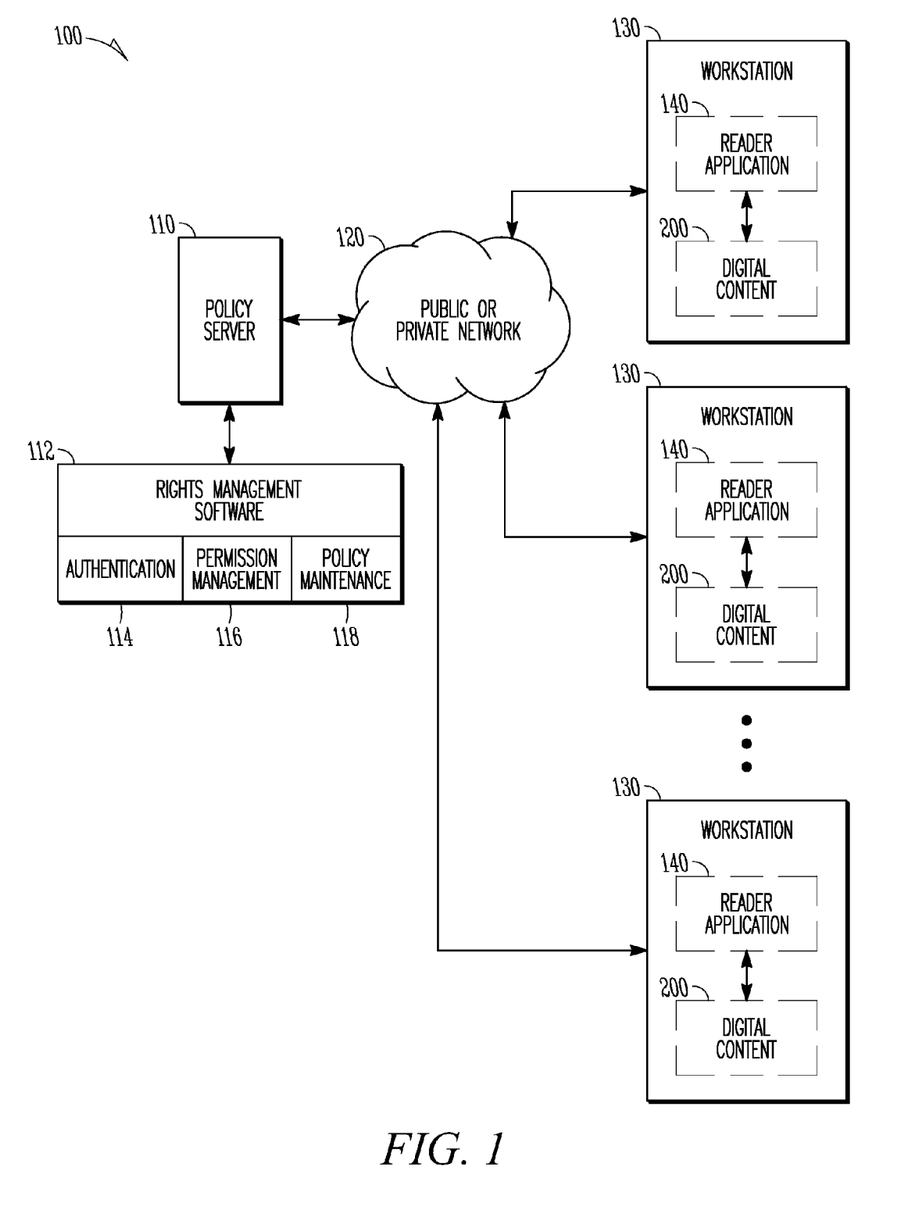
FIG. 1 illustrates a system according to one example embodiment of the inventive subject matter disclosed herein.

Referring now to FIG. 1 there is illustrated an overview of a first example embodiment of a system 100 including a policy server 110, one or more networks 120, such as private or public networks, and a plurality of workstation computers 130, such as but not limited to personal computers, and reader applications 140 operating on the workstation computers 130. Reader application 140, in one example embodiment, is a client application that opens digital content, such as a document, and enforces permissions, such as, for example but not by way of limitation, the Adobe Acrobat® line of programs, available from Adobe Systems, Inc. Policy server 110 includes digital rights management (DRM) software 112 for defining policies, associating policies to a unit of digital content 200, authenticating users 114, and permission management 116, for example through interaction with the reader applications 140, and policy maintenance functions 118.

Figure 2:
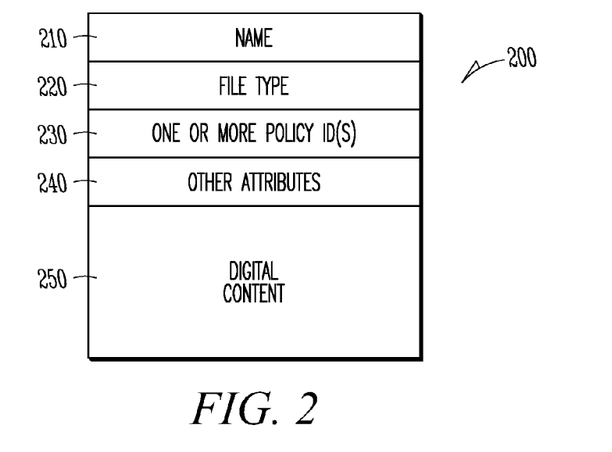
FIG. 2 illustrates digital content according to one example embodiment of the inventive subject matter disclosed herein.

Referring to FIG. 2, there is illustrated one example embodiment of a unit of digital content 200. Unit 200 may, by way of example but not limitation, take the form of an electronic document, for instance in a portable document format (PDF) as is made available by Adobe Systems Inc., or the form of a digital music file, digital audiovisual work file, or any other type of digital file that contains content that a user may seek to access. Unit 200, for example, but not by way of limitation, may include the following components: i) a name 210; ii) indication of file type 220, such as PDF, Word document, Excel spreadsheet, or other type of file; iii) the identification 230 of a rights management policy associated with the document, or a copy of the actual policy; iv) or other attributes 240; and v) digital content 250 such as a document, illustration, music, audiovisual work, or any other media in digital form.

Figure 3:
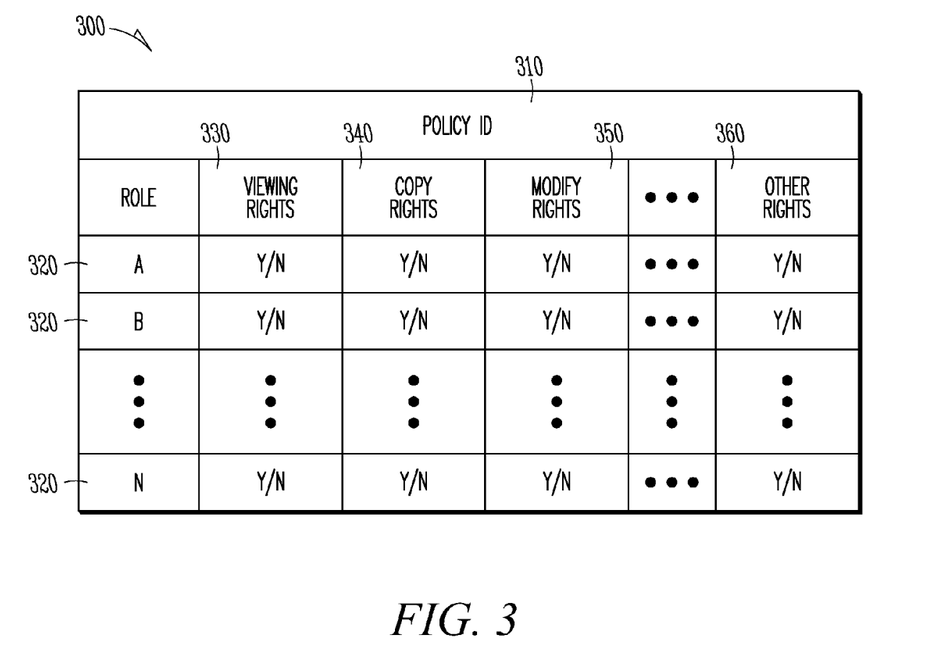
FIG. 3 illustrates a digital rights management policy according to one example embodiment of the inventive subject matter disclosed herein.

Referring now to FIG. 3, there is illustrated one example embodiment of a digital rights management policy 300. Policy 300 has an identification 310, and specifies, for example, one or more permissions relating to the digital content. For example but not by way of limitation, such permissions may specify, for each of one or more roles 320 (A, B, . . . N), the following: i) rights to access and view the content 330; ii) rights to copy the content 340; iii) rights to modify or add to the content 350; and/or iv) other rights 360. A policy 300 may be associated with a unit of digital content 200, for example by tracking an association of the digital content 200 with a policy 300 on the policy server 110, or by replication of the policy 300 in the unit of digital content 200.

Figure 4A:
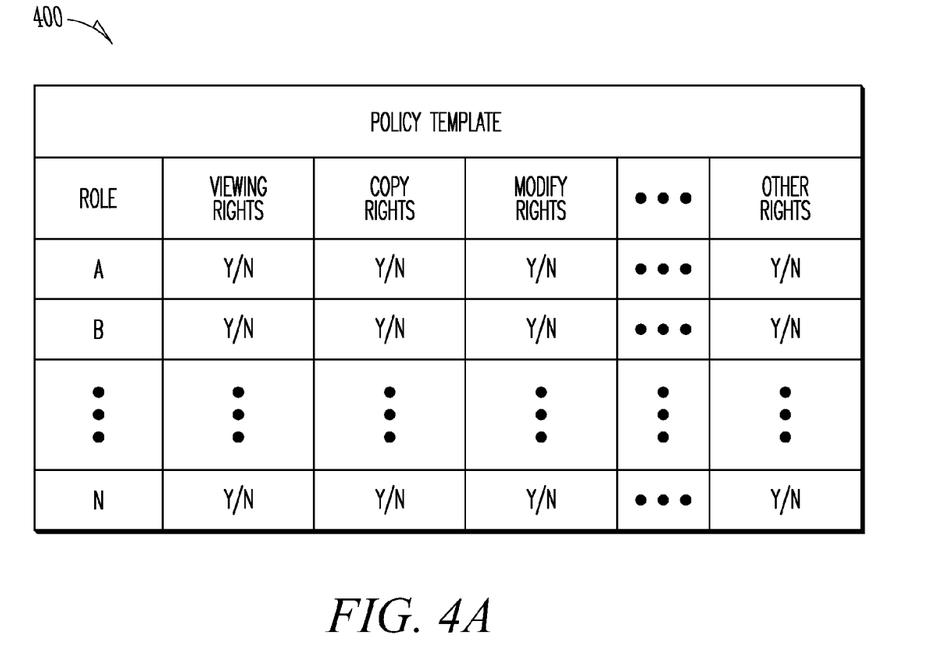
FIG. 4A illustrates a digital rights management policy template according to one example embodiment of the inventive subject matter disclosed herein.

Referring now to FIG. 4A, there is illustrated one example embodiment of a digital rights management policy template 400. A policy template 400 defines a set of policy permissions or other attributes that may be desirable to specify in a policy. The policy permissions may be specified, for example but not by way of limitation, in the same or similar manner to which such permissions are specified in a policy 300. It is used, however, not necessarily as a policy to associate with a specific unit of digital content 200, but rather as a template to be used to define a policy 300 for a specific unit of digital content 200.

Figure 4B:
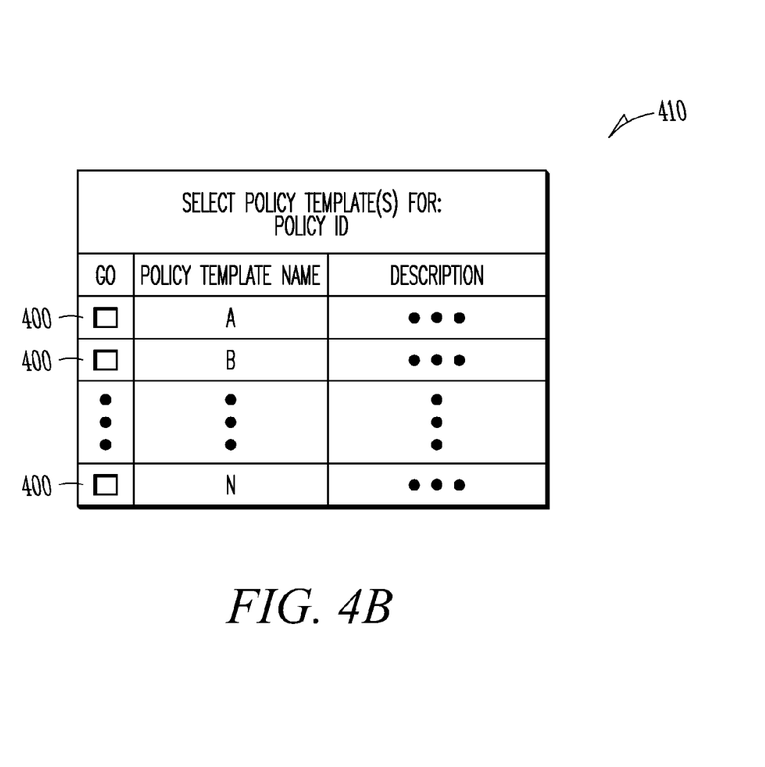
FIG. 4B illustrates a user interface according to one example embodiment of the inventive subject matter disclosed herein.

For this purpose, as shown in FIG. 4B, one or more policy templates 400 are displayed in a user interface 410 by policy creating and maintenance functions 118 that may run on the policy server 110 and/or alternatively run on a workstation computer 130. User interface 410 provides an interface that allows a user such as a policy administrator, creator, or editor, to select one or more policy templates 400 to use to create a specific policy 300.

Figure 5:
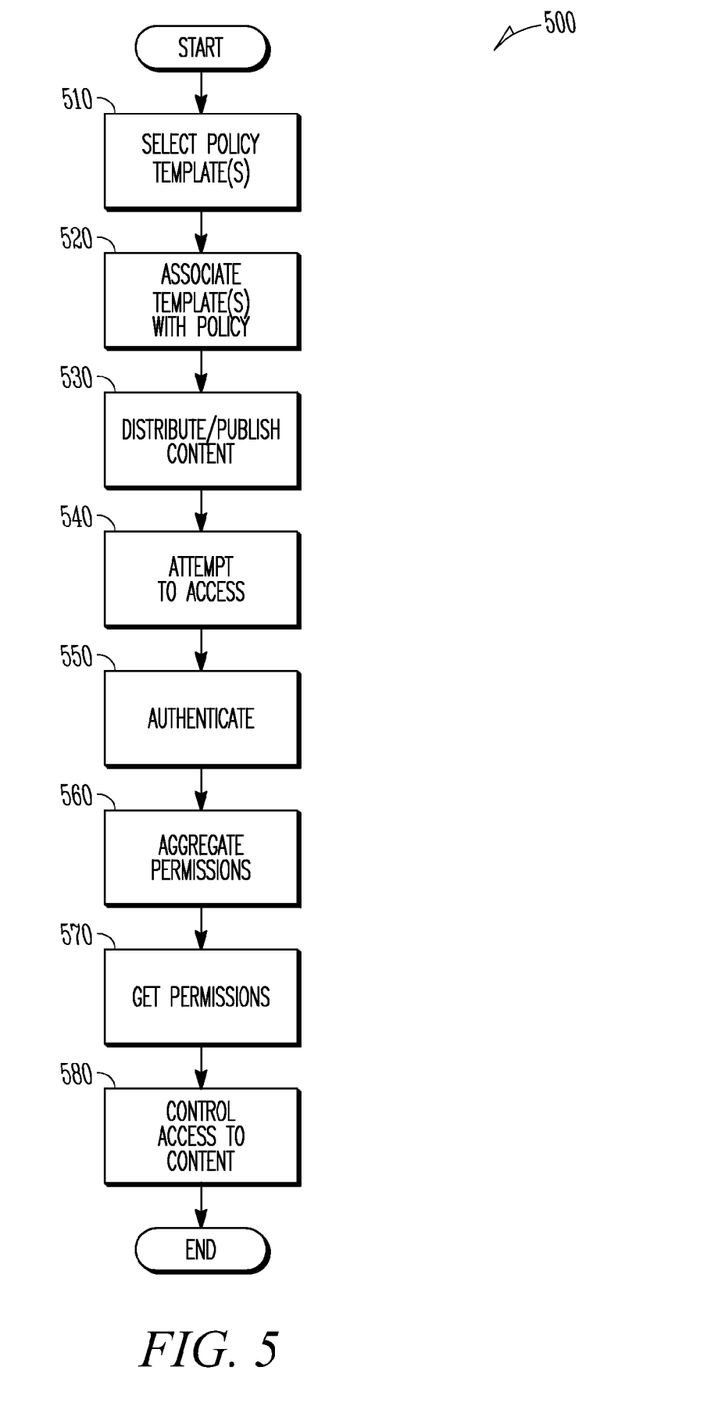
FIG. 5 illustrates a flow chart of an example embodiment of a method according to the inventive subject matter disclosed herein.

Referring now to FIG. 5, for example but not by way of limitation, to create a specific policy 300, as illustrated in the flow chart 500, one or more policy templates 400 may be selected 510, for example using a pointing device in a graphical user interface, or alternatively by specifying the name of the templates. Each policy template 400 may include permissions specified as noted above. The maintenance functions 118, for example, may, in one embodiment, associate 520 one or more templates to the policy 300 for a specific unit of digital content 200. The particular unit of digital content 200 may be distributed to more than one content user 530, and a content user may attempt to access 540 the particular unit of digital content 200. Upon authentication 550 of the user to the policy server 110, the policy server 110 may aggregate 560 the permissions of each policy template 400 associated with the content, store them temporarily or permanently for reference, and thereby define the aggregated policy permissions allowed to the user for this particular unit of digital content 200. The reader application 140 may then communicate 570 with the policy server 110 to determine what aggregated permissions are afforded to the authenticated content user. The reader application 140, using the aggregated permissions, then controls 580 access and use of the digital content based on the aggregated permissions.

According to one embodiment, the reader application 140 downloads the aggregated permissions and keeps them at least during the session in which the authenticated user is accessing the document. According to another embodiment, the reader application 140 may not download the permissions and instead refer back to the policy server 110 each time it needs to determine if an action sought by the authenticated user is allowed.

Figure 6A:
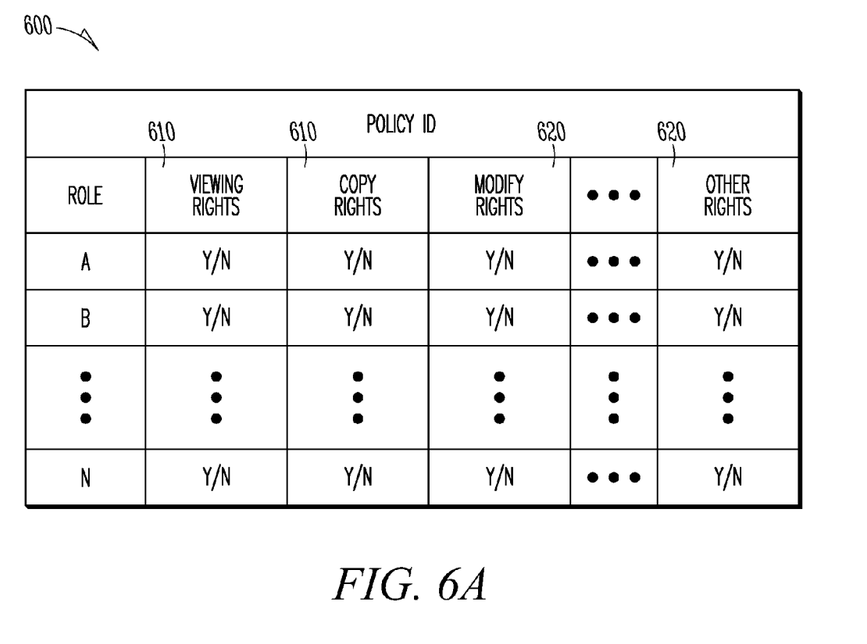
FIG. 6A illustrates still another digital rights management policy template according to one example embodiment of the inventive subject matter disclosed herein.

Referring now to FIG. 6A, there is illustrated still another example embodiment of a policy 600, wherein policy 600 includes a plurality of permissions which include a plurality of permissions 610 obtained from first policy template 400, and one or more additional policy permissions 620 that are specified for a particular unit of content 200 to augment the permissions from the policy template 400.

Figure 6B:
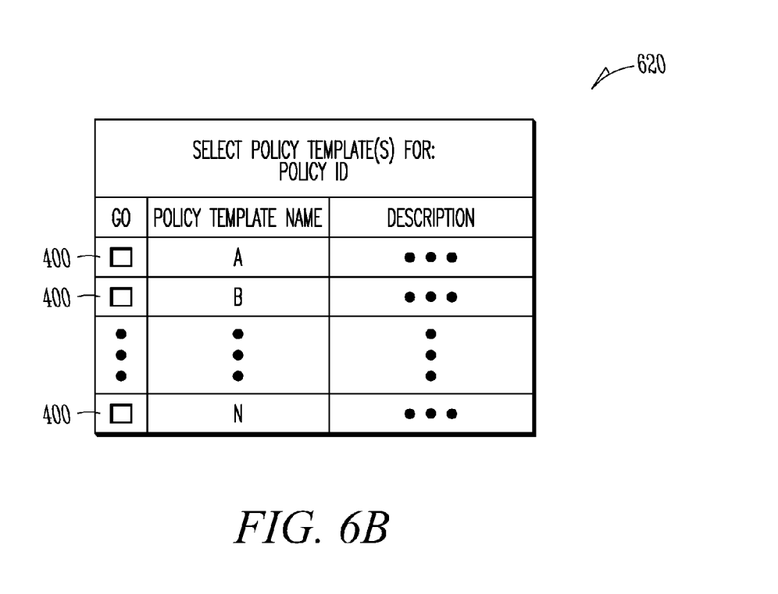
FIG. 6B illustrates a further user interface according to one example embodiment of the inventive subject matter disclosed herein.

Referring to FIG. 6B, one or more policy templates 400 are displayed in a user interface 620 of the maintenance program 118 that may run on the policy server and/or run on a workstation computer 130. User interface 620 provides an interface that allows a policy administrator, creator, or editor to select one or more policy templates 400 to use to create a specific policy 600.

Figure 7:
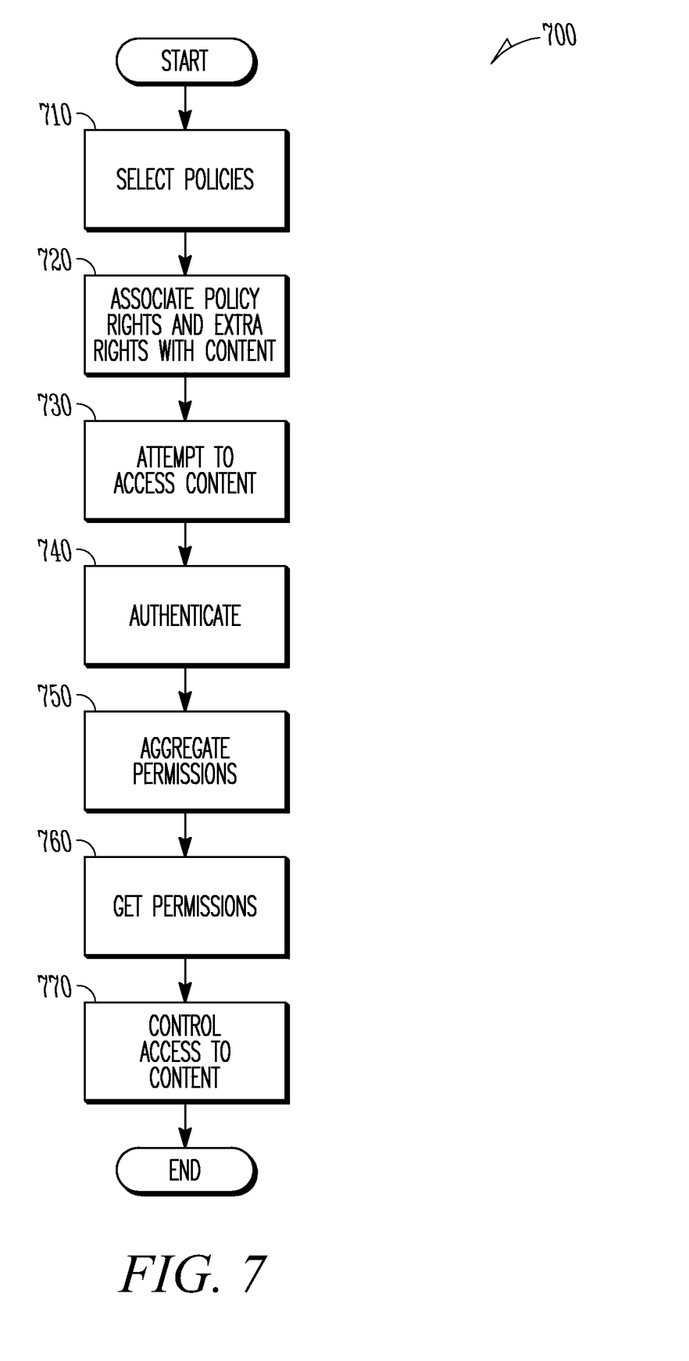
FIG. 7 illustrates a flow chart of a further method according to one example embodiment of the inventive subject matter disclosed herein.

For example but not by way of limitation, to create a specific policy 600, as illustrated in the flow chart 700 of FIG. 7, one of the policies templates 400 may be selected 710, for example using a pointing device in a graphical user interface, or alternatively by specifying the name of the policies. The selected policy template may include permissions specified as noted above. The maintenance program 118, for example, may, in one embodiment, request or permit a user, such as the policy administrator, creator, or editor, to augment the permissions from the policy template 400 by defining one or more additional permissions that, taken together with the permissions from the selected policy template 400, form the set of permissions desired. The maintenance program 118, for example, may, in one embodiment, associate 720 both the permissions from the selected policy template and the one or more additional permissions with a specific unit of digital content 200 specified by the user creating the policy. A content user may attempt to access 730 the particular unit of digital content 200, which may be distributed to more than one user. Upon authentication 740 of the user by the policy server 110, the policy server 110 may aggregate 750 the permissions of the selected policy template 400, and the one or more additional augmenting permissions earlier specified for that particular digital content 200, and, in one example embodiment, store the aggregate permissions temporarily or permanently for reference, and thereby define the aggregated policy permissions allowed to the content user for this particular unit of digital content 200. The reader application 140 may then communicate 760 with the policy server 110 to get or determine the aggregated permissions 770 that are afforded to the authenticated user. The reader application 140, using the aggregated permissions, then controls 760 access and use of the digital content based on the aggregated permissions. According to one example embodiment, the augmented set of permissions are not represented in the policy server 110 as a new policy available for re-use by, for example, authors or publishers for other content, for example to be selected and assigned to other content at a future time. This may provide for reducing the number of policies exposed to users using, creating, maintaining, or editing policies, and have the effect of reducing unwanted "policy clutter" owing to a multiplicity of similar but slightly different polices The augmented set of permissions may be, however, represented and maintained in the server so that they can be identified and used as required to control access to associated content. The augmented set of permissions may be, in one example embodiment, kept as "hidden policies" that are not exposed to users, for example users authorized to create and assign policies to units of digital content, but are otherwise stored in the system. For example, policies may be "hidden" in a manner similar to the way system files may be "hidden" in the Windows® operating system distributed by Microsoft Corporation.

According to one embodiment, the reader application 140 downloads the aggregated permissions and keeps them at least during the session in which the authenticated user is accessing the document. According to another embodiment, the reader application 140 may not download the aggregated permissions and instead refer back to the policy server each time it needs to determine if an action sought by the authenticated user is allowed. According to yet another example embodiment, the reader application 140 may not be required or requested to authenticate the user, and the policy may be universal for any user accessing the document or content.

According to one example embodiment, the above-described customized policy with aggregated permissions may be implemented as "hidden" policy, in other words a policy that does not appear in the catalog, list, or library of policies available to a user to select to assign to another unit of digital content such as content 200, but in fact is implemented in the system as if it were one of policies 300, wherein there is a specific policy identifiable in the system and available for viewing and revision from a policy management interface.

Figure 9:
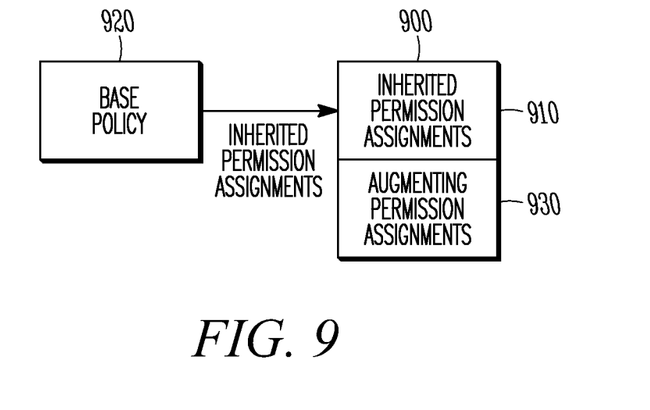
FIGS. 9 and 10 illustrate inheritance of policy attributes according to one example embodiment of the inventive subject matter disclosed herein.
Figure 10:
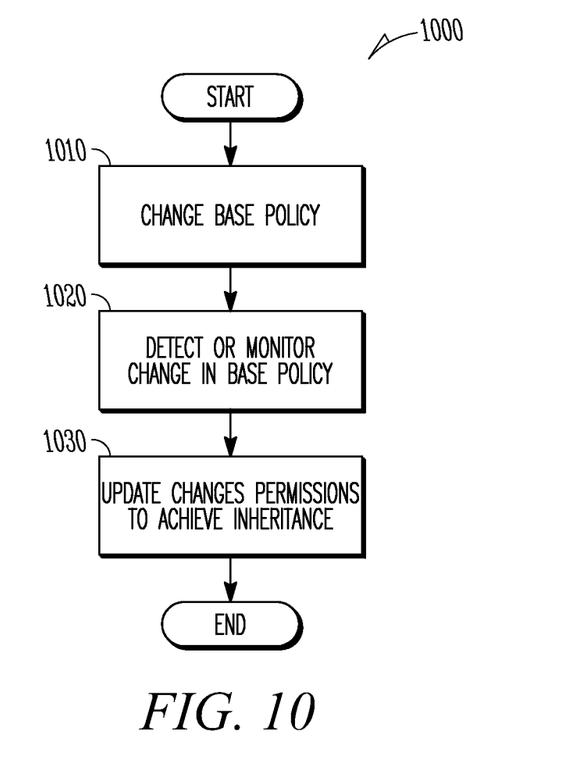

According to still another example embodiment, the policy server 110 may support inheritance for policy definition and maintenance. That is, when creating a policy it is possible to have it inherit permission assignments from a base policy. This allows that if permissions or other attributes in the base policy are changed, then the permissions or other attributes of all other policies that extend it will change dynamically. Referring to FIGS. 9 and 10, there is illustrated a flow chart of an example embodiment of policy inheritance according to the inventive subject matter. As illustrated in FIG. 9, a policy 900 includes inherited permission assignments 910 inherited from an external or base policy 920, and additional or augmenting permission assignments 930. As illustrated in FIG. 10, an example method 1000 for updating inherited permission assignments in policy 900 includes changing 1010 the base policy 920, detecting or monitoring 1020 the changes in the base policy 920, and providing for policy 900 to inherit 1030 the changed permission assignments from policy 920. In one example embodiment, such inheritance may be accomplished using a policy server, such as policy server 110, for example wherein the policy server dynamically determines the permission assignments provide by policy 900 each time a reader application, such as reader application 140, or other application requests those permissions for the purpose of authorizing a user access to the associated digital content. Alternatively, the policy 900 may be updated with any changed permission assignments any time the policy server detects changes in the base policy 920.

According to still another example embodiment, the system of FIGS. 1-5 and FIGS. 6-7 may be used in combination, such that a policy may be specified as a combination of two or more templates in addition to one or more additional permissions specified for a particular unit of digital content.

According to one example embodiment, a policy of any of the above-described type may be associated with a group, and if a user is a member of that group as determined by a policy server such as policy server 110, the user will obtain the permissions of such policy.

Thus, according to the foregoing, the example subject matter described herein may allow for the reduction in excessive multiplicities of special policies that differ little from one another, allowing for easier use of the system but reducing clutter. An increased number of policies is harder to manage and is confusing to end users. The system and methods further provide for reusing a policy, such as policy 300, or policy template, such as template 400 with common basic permissions, with one or more customizations specific only to a particular unit of digital content, such as content 200. Thus, using the various embodiments herein illustrated, it may not be necessary to define new policies in the system if an aggregation of existing policies can express how the user, for example a publisher of content, wants to secure their content. Further, documents or content may be secured with any set of permissions assignments while keeping to a minimum the number of policies that need to be managed in the system.

According to another example embodiment, the system and method may allow for any digital rights management policy 300 to be used as a policy template 400, or the system and method may provide that templates 400 are maintained separately and only policy templates 400 are allowed to be used to define and create policies such as described above herein.

Figure 8:
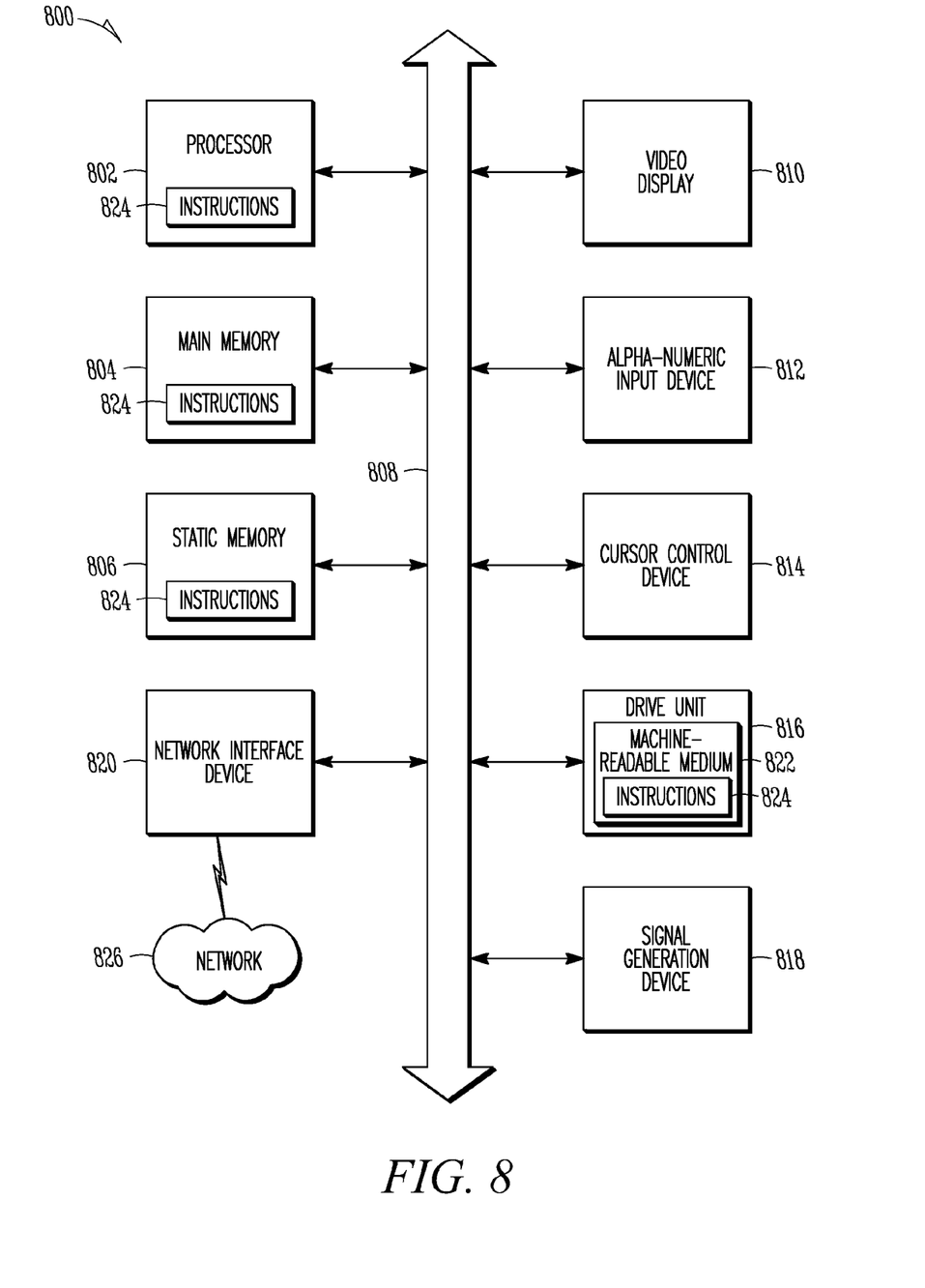
FIG. 8 illustrates a diagram of one example embodiment of a computing system architecture according to the inventive subject matter disclosed herein.

FIG. 8 shows a diagrammatic representation of a machine in the example form of a computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820. The disk drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media.

The instructions 824 may further be transmitted or received over a network 826 via the network interface device 820 utilizing any one of a number of well-known transfer protocols, for example the hyper text transfer protocol (HTTP).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical media, and magnetic media.

According to still another example embodiment, the above-described system and method may be used in combination with the method and system for user authentication described in U.S. application Ser. No. 11/311,758, entitled, "AUTHENTICATION USING A DIGITAL RIGHTS MANAGEMENT POLICY", by Gary Gilchrist and Sangameswaran Viswanathan, filed on even date herewith, and assigned to Adobe Systems Inc., hereby incorporated herein by reference. In particular, the authentication systems and methods described therein may be used in combination with the system and method described herein, for example defining a policy for a document using multiple policy templates and/or augmenting a policy template to create a policy associated with a particular unit of digital content.

In this description, numerous specific details are set forth. However, it is understood that embodiments of the invention may be practiced without these specific details. In other instances, well-known circuits, software, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the inventive subject matter can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration. Further, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with reference to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel.

What is claimed is:

1. A method comprising:
receiving a first selection of a policy template from a plurality of policy templates, the selected policy template defining a set of permissions from which to generate a policy for a unit of digital content;
receiving an additional permission with which to augment the set of permissions;
augmenting, using a processor of a machine, the set of permissions by adding the additional permission to the set of permissions to form an augmented set of permissions for the unit of digital content; and
maintaining the augmented set of permissions as a hidden policy for access control usage for the unit of digital content, the hidden policy being unavailable for assignment to a different unit of digital content.

2. The method of claim 1, further comprising assigning the augmented set of permissions to the unit of digital content.

3. The method of claim 2, wherein the assigning includes providing a copy of the augmented set of permission assignments for inclusion in the unit of digital content.

4. The method of claim 1, further comprising providing the augmented set of permissions to a reader application for temporary storage during a session in which the unit of digital content is accessed.

5. The method of claim 1, further comprising:
displaying to a user a listing of the plurality of different policy templates to allow the user to select the policy template from the plurality of different policy templates from which to generate the policy for the unit of digital content.

6. The method of claim 1, further comprising storing a plurality of different policies on a policy server, at least one of the plurality of policies inheriting a set of permissions from a base policy such that if a permission in the base policy is changed then the change is automatically applied to a corresponding permission in the at least one of the plurality of different policies.

7. The method of claim 6, wherein the automatically applied change is triggered in response to detecting a change in the base policy.

8. The method of claim 6, wherein the automatically applied change is made in response to an application requesting access to content associated with the at least one of the plurality of policies.

9. The method of claim 1, further comprising:
receiving a second selection of a policy template from the plurality of policy templates, the second selected policy template defining a second set of permissions from which to generate the policy for the unit of digital content; and
aggregating the set of permissions and the second set of permissions to form an aggregated set of permissions, wherein the additional permission is augmented to the aggregated set of permissions to form the augmented set of permissions for the unit of digital content.

10. The method of claim 1, further comprising:
authenticating a user trying to access the unit of digital content; and
sending the set of permission assignments to a reader application associated with the user.

11. A system comprising:
a policy server machine to store a plurality of different policy templates; and
one or more computer programs operable on the policy service machine to:
receive a first selection of a policy template from a plurality of policy templates, the selected policy template defining a set of permissions from which to generate a policy for a unit of digital content;
receive an additional permission with which to augment the set of permissions;
augment the set of permissions by adding the additional permission to the set of permissions to form an augmented set of permissions for the unit of digital content; and
maintain the augmented set of permissions as a hidden policy for access control usage for the unit of digital content, the hidden policy being unavailable for assignment to a different unit of digital content.

12. The system of claim 11, wherein the one or more computer programs are further operable to assign the augmented set of permissions to the unit of digital content, the assigning includes providing a copy of the augmented set of permission assignments for inclusion in the unit of digital content.

13. The system of claim 11, wherein the one or more computer programs are further operable to inherit a set of permissions from a base policy so that a change in a permission to the base policy causes the change to be automatically applied to a corresponding permission of the selected policy template.

14. The system of claim 11, wherein the one or more computer programs are further operable to:
receive a second selection of a policy template from the plurality of policy templates, the second selected policy template defining a second set of permissions from which to generate the policy for the unit of digital content; and
aggregate the set of permissions and the second set of permissions to form an aggregated set of permissions, wherein the additional permission is augmented to the aggregated set of permissions to form the augmented set of permissions for the unit of digital content.

15. A non-transitory machine-readable storage medium in communication with at least one processor, the machine-readable storage medium storing instructions which, when executed by the at least one processor, provides operations comprising:
receiving a first selection of a policy template from a plurality of policy templates, the selected policy template defining a set of permissions from which to generate a policy for a unit of digital content;
receiving an additional permission with which to augment the set of permissions;
augmenting, using a processor of a machine, the set of permissions by adding the additional permission to the set of permissions to form an augmented set of permissions for the unit of digital content; and
maintaining the augmented set of permissions as a hidden policy for access control usage for the unit of digital content, the hidden policy being unavailable for assignment to a different unit of digital content.

16. The non-transitory machine-readable storage medium of claim 15, wherein the operations further comprise assigning the augmented set of permissions to the unit of digital content.

17. The non-transitory machine-readable storage medium of claim 16, wherein the assigning includes providing a copy of the augmented set of permission assignments for inclusion in the unit of digital content.

18. The non-transitory machine-readable storage medium of claim 15, wherein the operations further comprise providing the augmented set of permissions to a reader application for temporary storage during a session in which the unit of digital content is accessed.

19. The non-transitory machine-readable storage medium of claim 15, wherein the operations further comprise storing a plurality of different policies on a policy server, at least one of the plurality of policies inheriting a set of permissions from a base policy such that if a permission in the base policy is changed then the change is automatically applied to a corresponding permission in the at least one of the plurality of different policies.

20. The non-transitory machine-readable storage medium of claim 15, wherein the operations further comprise:
receiving a second selection of a policy template from the plurality of policy templates, the second selected policy template defining a second set of permissions from which to generate the policy for the unit of digital content; and
aggregating the set of permissions and the second set of permissions to form an aggregated set of permissions, wherein the additional permission is augmented to the aggregated set of permissions to form the augmented set of permissions for the unit of digital content.

\* \* \* \* \*